No. 762,880. PATENTED JUNE 21, 1904.
J. A. CHAMBERS.
METHOD OF DRAWING GLASS ARTICLES.
APPLICATION FILED OCT. 26, 1903.
NO MODEL.
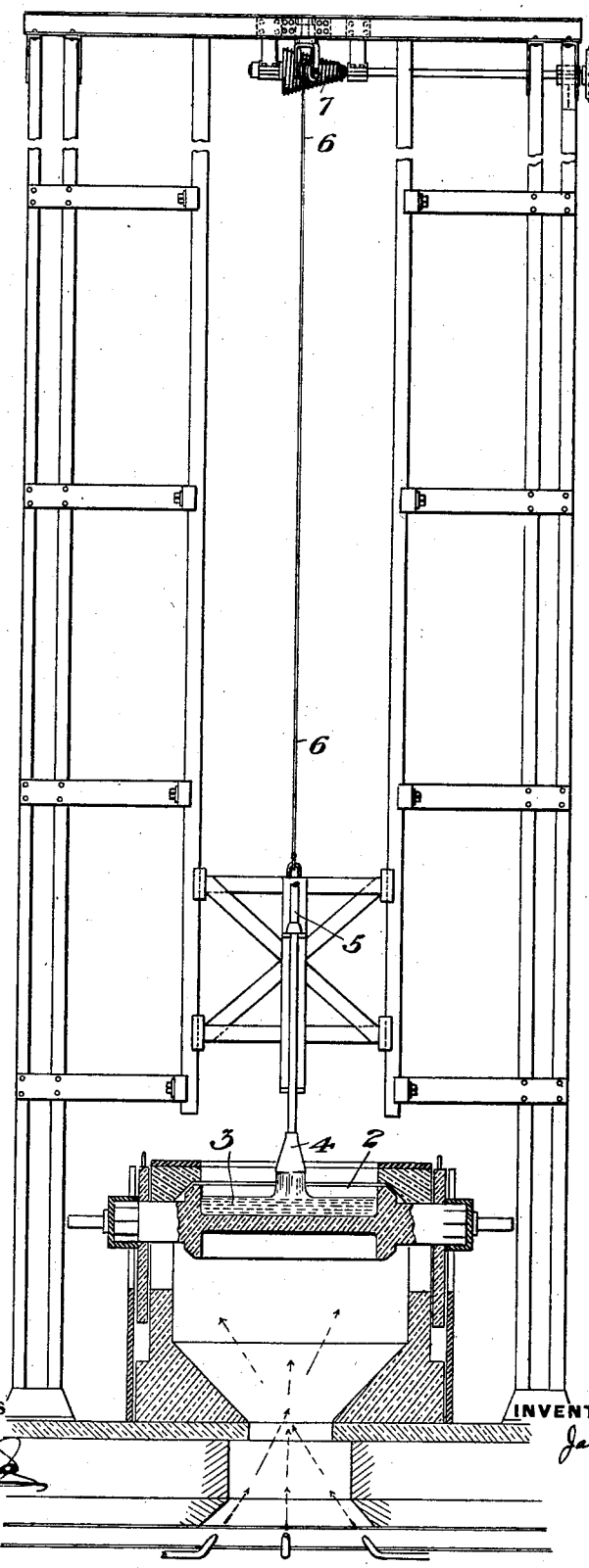
WITNESSES
INVENTOR No. 762,880. Patented June 21, 1904.

UNITED STATES PATENT OFFICE.

JAMES A. CHAMBERS, OF ALLEGHENY, PENNSYLVANIA, ASSIGNOR TO WINDOW GLASS MACHINE COMPANY, OF PITTSBURG, PENNSYLVANIA, A CORPORATION OF NEW JERSEY.

METHOD OF DRAWING GLASS ARTICLES.

SPECIFICATION forming part of Letters Patent No. 762,880, dated June 21, 1904.

Application filed October 26, 1903. Serial No. 178,468. (No model.)

*To all whom it may concern:*

Be it known that I, JAMES A. CHAMBERS, of Allegheny, Allegheny county, Pennsylvania, have invented a new and useful Method of Drawing Glass Articles, of which the following is a full, clear, and exact description, reference being had to the accompanying drawing, forming part of this specification, in which the figure is a side elevation, partly in section, showing one form of apparatus for carrying out my invention.

My invention relates to the drawing of glass articles from a molten bath, and is designed to increase the output of drawing-machines and to make the thickness of the glass more uniform throughout the cylinder or article being drawn.

Heretofore in the drawing of cylinders and similar articles from receptacles containing a molten-glass bath the bait has been drawn upwardly at substantially the same speed throughout the drawing of the article. In such cases, especially where a cylinder is drawn two or three times the length of a roller, the glass of the lower portion of the cylinder is thicker than that in the upper portion. I have found that this difference in thickness is due to the gradual chilling of the glass in the bath, the glass gradually growing stiffer through the time occupied in the drawing operation, and that by gradually increasing the speed of the bait during the drawing operation I can reduce the time occupied in drawing and produce an article having a more uniform thickness of glass throughout its length.

In the drawing, in which I show one form of apparatus for carrying out my invention, 2 is the drawing-pot containing the molten glass 3.

4 is the bait or drawing tool, which in the form shown is hollow, and connected to the air-supply pipe or channel 5. The tool is drawn upwardly by a wire rope or cord 6, which is wound upon a conical pulley or drum 7. This drum is driven by any suitable mechanical connections, such as gearing, from an electric motor, which rotates at a uniform speed. During the drawing operation the rope begins to wind upon a smaller end of the drum and then upon successive larger portions of the drum, thereby automatically increasing the rate of speed at which the bait is drawn upwardly. After the drawing operation is completed the glass may be cut off at the bottom and the cylinder removed in any desirable manner.

The bottom of the pot is preferably heated during the drawing operation; but this heating has been found insufficient to prevent gradual lowering of the temperature of the glass during drawing.

The advantages of my invention result from the automatic gradual increasing of the speed of drawing during the operation. This reduces the time occupied in drawing and also makes the glass more uniform in thickness throughout the length of the cylinder or article being drawn.

The method may be used in drawing sheets, cylinders, or other articles, and different forms of apparatus may be employed without departing from my invention.

I claim—

1. The method of shaping glass articles consisting in drawing them from a glass-bath and gradually increasing the speed of drawing through the drawing operation; substantially as described.

2. The method of shaping glass articles consisting in drawing them upwardly from a bath of molten glass and gradually and automatically increasing the speed of the drawing operation; substantially as described.

In testimony whereof I have hereunto set my hand.

JAMES A. CHAMBERS.

Witnesses:
 GEO. B. BLEMING,
 C. P. BYRNES.